United States Patent
Thomas

(10) Patent No.: US 9,110,443 B2
(45) Date of Patent: Aug. 18, 2015

(54) SYSTEMS AND METHODS FOR SHEAR-CORRECTED DIGITAL HOLOGRAM ACQUISITION

(75) Inventor: Clarence E. Thomas, Knoxville, TN (US)

(73) Assignee: Third Dimension IP LLC, Knoxville, TN (US)

(*) Notice: Subject to any disclaimer, the term of this patent is extended or adjusted under 35 U.S.C. 154(b) by 198 days.

(21) Appl. No.: 13/106,964

(22) Filed: May 13, 2011

(65) Prior Publication Data

US 2011/0279878 A1 Nov. 17, 2011

Related U.S. Application Data

(60) Provisional application No. 61/345,132, filed on May 16, 2010.

(51) Int. Cl.
  *G01B 9/021* (2006.01)
  *G03H 1/08* (2006.01)
  *G03H 1/04* (2006.01)

(52) U.S. Cl.
  CPC .............. *G03H 1/08* (2013.01); *G01B 9/021* (2013.01); *G03H 1/0443* (2013.01); *G03H 2001/0456* (2013.01); *G03H 2222/13* (2013.01)

(58) Field of Classification Search
  USPC .............. 359/10, 11, 29, 35, 7; 356/450, 457, 356/484, 489
  See application file for complete search history.

(56) References Cited

U.S. PATENT DOCUMENTS

| | | | |
|---|---|---|---|
| 6,525,821 B1* | 2/2003 | Thomas et al. | 356/457 |
| 6,999,178 B2* | 2/2006 | Hanson et al. | 356/484 |
| 7,068,375 B2* | 6/2006 | Voelkl | 356/489 |
| 7,411,708 B2* | 8/2008 | Waldman et al. | 359/29 |

* cited by examiner

*Primary Examiner* — Audrey Y Chang
(74) *Attorney, Agent, or Firm* — Law Offices of Mark L. Berrier

(57) ABSTRACT

Systems and methods for shear-corrected digital hologram acquisition, wherein the shear-corrected geometry is highly suited for two (or more) color operation with either broadband or laser illumination. An apparatus for shear-corrected recording of a spatially heterodyne hologram with broadband or laser illumination includes: an illumination source; a beamsplitter optically coupled to said illumination source(s); a reference beam corner-mirror pair for translation and phase-shaping of the object beam optically coupled to the beamsplitter; an object optically coupled to the beamsplitter; a focusing lens optically coupled to both the reference beam corner-mirror pair and the object; and a digital recorder optically coupled to the focusing lens. A reference beam is incident upon the translating and phase-shaping corner-mirror pair, and the reference beam and an object beam are focused by the focusing lens at a focal plane of the digital recorder to form a spatially heterodyne hologram.

15 Claims, 4 Drawing Sheets

SYSTEMS AND METHODS FOR SHEAR-CORRECTED DIGITAL HOLOGRAM ACQUISITION

CROSS-REFERENCE TO RELATED APPLICATIONS

This application claims the benefit of U.S. Provisional Patent Application 61/345,132, filed May 16, 2010, which is incorporated by reference as if set forth herein in its entirety.

BACKGROUND

1. Field of the Invention

The present invention relates generally to the field of holography. More particularly, the present invention relates to a shear-corrected digital hologram acquisition system suitable for use with "white light" (spectrally broadband) or laser illumination, or two-color illumination. For the two-color (more than two colors is also possible) implementation, the two colors may either both be broadband (low or very low coherence) illumination, or laser illumination. In one preferred implementation of the present invention, a laser is used for illumination, a mirror exclusive to the reference arm or corner mirror pair and an extended beam-combiner are used to create the phase-shift and shear-correction in the reference arm, and the hologram is recorded on a digital camera. The present invention thus relates to a digital hologram acquisition system.

2. Related Art

Prior methods of classical holography (1-4) and of digital hologram acquisition (5-9) have required both laser (coherent) illumination and that the reference and object (target) beams be combined at some angle (there is a shear between the two beams). Lasers have a number of problems, including high expense and generally requiring very extensive safety precautions, which makes them even more expensive. Additionally, since lasers have long coherence lengths (compared to broader band illumination sources), small reflections from optical surfaces will interfere with and make significant noise in the digital hologram. Previous methods have also required an angle (shear) between the two beams to create the spatially heterodyne fringe pattern that actually records the hologram. The shear is created by reflecting the reference beam from a mirror or beamsplitter so that it propagates at a different angle than the object (target) beam. In general digital holography systems require a small angle between the two beams; otherwise the fringes are too fine to be recorded by the digital camera or recorder being used. For common path systems, such as a Michelson geometry, or the last leg of a Mach-Zender geometry to the digital recorder, this means that the beams separate spatially from one another, and in fact makes it impossible to use a Michelson geometry for systems with high magnification—the reference beam becomes so separated due to the shear that it is either clipped by the optics, does not overlay the object beam, or both. Even with the shorter common path Mach-Zender layout, shear between the two beams often causes problems in achieving adequate overlay of the beams.

A system proposed by Thomas (10) teaches how to use a shearless system to solve the problem of non-overlapped beams of the sheared systems. The shearless system however requires generally expensive diffractive or holographic optical elements to eliminate the sheared beams problem.

FIG. 1 shows a prior art digital holography system with a Michelson geometry, where the shear between the two beams is indicated. Note that for this particular case, nominally a high-magnification case, the reference and object beams no longer have any overlap, as indicated, and therefore cannot form a hologram.

SUMMARY OF THE INVENTION

Therefore, there is a particular need for a method for 1) recording digital holograms in a shear-corrected geometry. Significant features of an apparatus for shear-corrected digital hologram acquisition include the use of an extended beam-combiner or a separate exclusive mirror for the reference arm; using a broad-band illumination source with the optical paths, both longitudinal and transverse, matched to better than the longitudinal and transverse coherence lengths; arranging the system so that two (or more) colors can be used to record simultaneous holograms on the same digital camera exposure, or sequentially recording two (or more) colors on the same exposure by offsetting the direction of the carrier fringe recordation between the two (or more) colors; and building and aligning the system, or rotating the coordinate axes, so that the spatially heterodyne carrier frequency fringes are substantially aligned along either the x-axis or y-axis (or one color on the x-axis and one color on the y-axis for two-color recordation) of the system so that a 1-D FFT can be used rather than a 2-D FFT. The alignment requirement can be replaced by axis rotations which make one axis of the coordinate system perpendicular to the carrier-frequency fringes of the object wave to be recovered from the hologram.

The systems and methods for advanced digital holography disclosed herein allow for the use of shear-corrected optical systems, for the use of less expensive apparatus, and for improved quality of digital hologram acquisition. By contrast, the prior art does not describe any method for forming a shear-corrected digital hologram. Shear-corrected formation with an extended beam-combiner allows the use of the simpler Michelson geometry even in high magnification applications, and also remains an advantage for beam overlay even using the more complex Mach-Zender geometry.

BRIEF DESCRIPTION OF THE DRAWINGS

A clear conception of the advantages and features of embodiments of the present invention, and of the components and operation of model systems provided with these embodiments, will become more readily apparent by referring to the exemplary, and therefore nonlimiting, embodiments illustrated in the drawings accompanying and forming a part of this specification.

Figure 1:
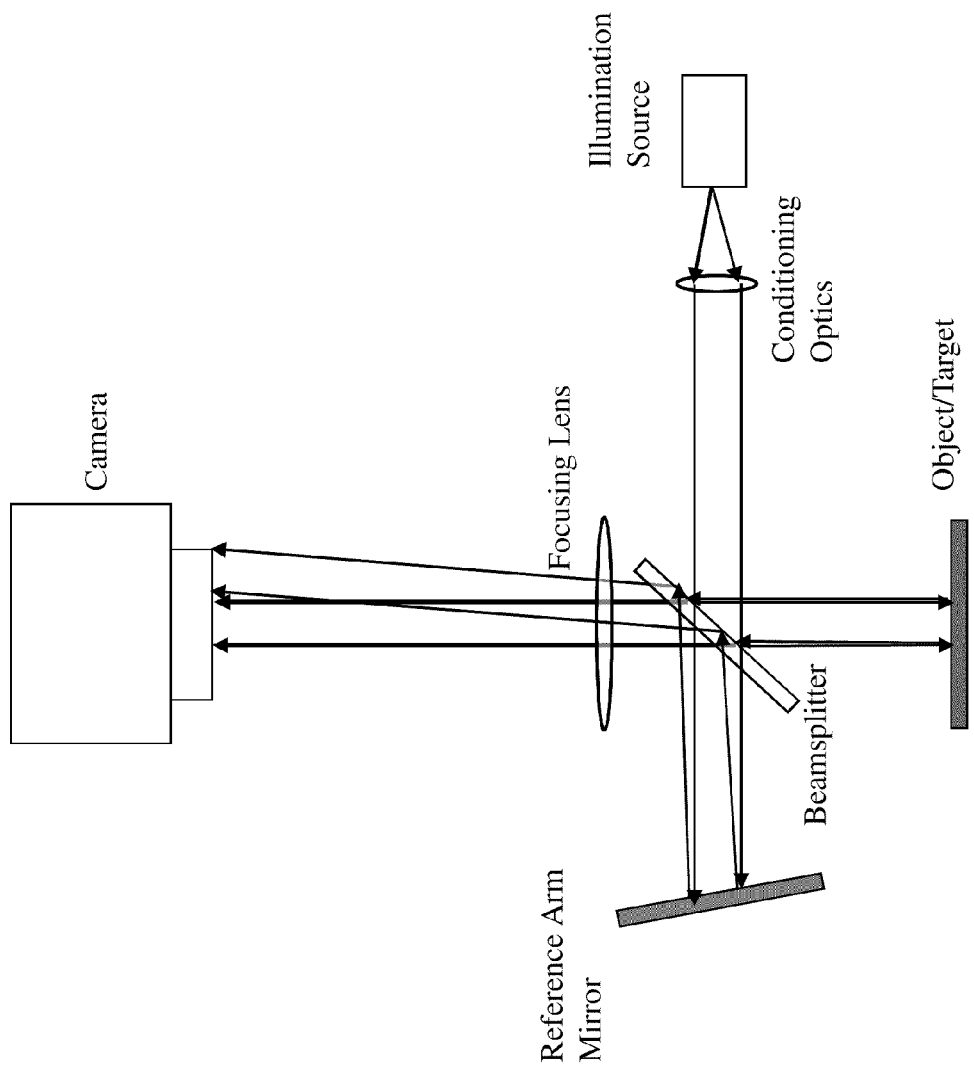
FIG. 1 illustrates a schematic of a prior art high-magnification Michelson system indicating that shear has caused the reference and object beams to no longer overlap.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

Embodiments of the present invention and the various features and advantageous details thereof are explained more fully with reference to the nonlimiting embodiments that are illustrated in the accompanying drawings and detailed in the following description. Descriptions of well-known components and processing techniques are omitted so as to not unnecessarily obscure the present invention in detail.

Holography Overview

In 1948/1949 Denis Gabor invented in-line optical holography (co-linear reference and illumination beams) in an effort to improve the resolution of electron microscopy (1). In the early 1960's Leith and Upatnieks invented optical spatially heterodyne (off-axis) holography (2,3). For heterodyne holography the object and reference beams are combined at an angle, forming a fringe pattern that acts as a spatial carrier frequency, diffracting the reference and object beams along separate paths when the hologram is replayed. This was a tremendous advance over the co-linear beams (obscuring one another) of in-line holography. Heterodyne holography, along with lasers and many long hours in darkrooms allowed the practical formation of holograms. Researchers also found that it was possible to use heterodyne holography (usually in the form of holographic interferometry (4)) for precision measurements.

This technique was used a fair amount in spite of the expense and difficulty of dealing with photographic plates and tens to hundreds of hours in a darkroom. In the last two decades digital holography has come into use (e.g., ORNL 1996 (5,6)). Since holograms record phase, with sensitivity to a thousandth of a wavelength, or better for well designed and constructed systems, precision measurements are possible at whatever frame rate can be achieved by the laser and digital camera (no darkrooms, no chemicals, no waiting). Frame rates of many thousands of frames per second and more are possible with modern digital cameras, and longitudinal sensitivities can reach the nanometer or even angstrom level, although transverse sensitivities are typically limited by diffraction to some fraction (close to one) of the laser wavelength being used times the effective F/# of the recording system:

$$\delta R \sim k\lambda F \quad (1),$$

where k is a number the order of one.

Brief Overview of Digital Holography

Digital holography was actually used for electron holograms before being independently developed for lasers (please see the reference by Voelkl, Allard, and Joy (13), and a number of the mathematical techniques developed for digital electron holography are directly applicable to optical digital holography. Several developments were required to make it possible to capture true optical holograms digitally. First, digital cameras are an enabling and necessary technology. Next, the object and reference beams must be combined at small angles in order to record holograms with a digital camera—otherwise the sub-micron fringes are too fine to record since digital cameras typically have five micron and larger pixels. Given a pixel-size d, an object beam arriving perpendicular to the imaging plane, a reference beam arriving at angle θ (small) to the object beam, and a wavelength λ of the laser, then to place at least two pixels across a fringe in the image plane (Nyquist condition: minimum two pixels to resolve a fringe) the following condition is required:

$$\sin \theta \leq 2d/\lambda \quad (2)$$

Imaging holography (object beam in-focus or close to focus at the recording plane) is generally required for the same reason—the diffraction fringes from a point rapidly become too fine to record as it goes out of focus. Additionally, there must be at least two carrier-frequency fringes across the minimum spatial scale to be resolved (three for highly-correlated images—the object-beam autocorrelation—FFT of the square of the object beam—has twice the spatial bandwidth of the object beam), in order to separate the object beam from the zero-order beams. Requiring two fringes across the spatial scale to be resolved implies magnification/demagnification sufficient to place at least four camera pixels across the spatial scale (more likely six, as a practical matter). Finally, Fourier transform analysis, as first-developed for electron digital holography (13), makes analysis of digital optical holograms easy and rapid. For a more extensive discussion of digital optical holograms see References (10), and (11).

Laser Plasma Density Measurements

It is well known that the phase change (δφ) of high-frequency waves passing through a plasma (wave frequency much greater than the plasma frequency) relative to passing through a vacuum is given by (where N is the plasma index of refraction, l is the path-length through the plasma and λ is the incident wavelength):

$$\delta\phi = (N-1)l(2\pi/\lambda) \quad (3).$$

Substituting the well-known high-frequency plasma refractive index leads to:

$$\delta\phi = -(\omega_p^2/2\omega^2)l(2\pi/\lambda) \quad (4).$$

And simplifying:

$$\delta\phi = -K\lambda n_e l \quad (5).$$

Where K=~2.82×10-15 m, λ is the incident wavelength (m), and $n_e l$ is the chord-integrated electron density ($m^{-2}$). Thus measuring the phase change on many independent chords (as with digital holography) leads to a 2-D profile, across the measurement area, of the chord-integrated density, $n_e l$.

Noise Sources and Estimates

Discussion of Noise Sources

The number of possible noise sources is large. As a practical matter operation of the prototype Shear-Corrected Digital Holography (SCDH) system and the high-speed SCDH system has shown that two noise sources are of major concern—unwanted reflections that reach the camera and vibrations.

Reflections

Reflections in a holographic system are particularly pernicious since if spurious object beam reflections are mixed with the reference beam, for example, then a 1% object beam intensity reflection is 10% in electric field, and will make a 10% noise level in the actual hologram (the hologram energy being proportional to $\sim E_{ref} E_o$, the reference and object beam electric fields). Extreme care has gone into the system design in order to eliminate unwanted reflections. The AR coats are all the highest quality available and nominally reflect less than 0.1% of the laser beam per surface. Second surfaces have been eliminated everywhere possible by eliminating components and for instance using Off-Axis Parabola (OAP) reflective beam-expander pairs so that there are no second-surfaces. Any windows (e.g., vacuum windows) receive the high-quality AR coat and are mounted at an angle of a few degrees to the system, so that all reflections are nominally headed out of the system. Any vacuum windows can also be wedged to prevent formation of an etalon, although this is likely not necessary for high-quality AR coats. The Wedged Plate Beam Splitter (WPBS) will be further discussed and no spurious reflections from it can reach the camera. Any refractive lenses that are used receive the highest quality AR coats and are decentered and/or angled slightly to eliminate reflections reaching the camera. Note that decentering lenses is a common practice and that very high end projectors all have decentering lenses so that the image is moved up or down without creating keystone distortion. Finally, the camera itself will likely need to be at a slight angle to both beams in order to prevent etalon formation between the camera window and sensor, or between the camera and other optics.

Vibrations

Having nominally eliminated reflections, vibrations become the apparent noise source of importance. The short laser pulse length (~4 μs or less) essentially eliminates any motions, which could wash out the hologram fringes, during the exposure of a hologram. Structural mechanical vibrations are typically at frequencies of 1 kHz or less and a 4 μs pulse clearly stops any motion due to these frequencies during an exposure. However, motion between frames can cause wedge and path-length change (apparent solid-body motion) to appear in the phase image for low-order vibrations, and actual distortion of the phase image for higher-order vibrations. In order to minimize vibrations, high-quality optical table tops are used for the main table and for the tower which mounts the retro-reflector—the only optical component not mounted on the main table. The optical components are mounted on 25.4 mm (1") diameter stainless rods at a very short height of 89 mm (3.5") above the table. All unnecessary optical adjustments (e.g., stages for position adjustment) are eliminated since fewer components leave fewer opportunities for vibration. No extraneous items are mounted on the main table and tower. All power supplies and the recirculating laser-chiller are mounted on vibration damping pads under the optical table, and the electronics fans in the camera have been replaced by a cold-plate. Similarly, vibration damping material can be inserted under the legs of the optical table(s) in order to isolate and damp vibrations that might still reach the table, or alternatively air-legs and other vibration eliminating mechanisms are available.

Moiré Beat Fringes

Somewhat surprisingly, it has been observed that the beat frequency between the hologram fringes and the camera pixel spatial frequency on the fringes (digitization of the fringes with the camera pixels) can cause strong low spatial-frequency frame to frame noise in the hologram phase images. This appears to be an interaction between small vibrations (changes in phase) and digitization of the fringes. Small (vibrational) phase changes cause significant movement in the beat fringes. The Moiré beats can actually be seen on-screen in the raw digital hologram images by forcing them to move (lean against the table slightly or put light pressure on a mirror). Unless they are forced to move the beat fringes are almost impossible to see. The noise was discovered by noting that the frame to frame difference noise in the phase images had the same spatial period as the Moiré beats. This noise source can be largely overcome by using a perfect integer number of pixels per fringe (e.g., 31.999 fringes across 128 pixels, or ~4 pixels per fringe). It can take 30 minutes to an hour to adjust the reference beam and object beam angles this closely, but the present system is stable enough for this to last for days or weeks. Adding remotely adjustable micrometers to the reference beam mirror and a live spatial FFT of the image would cut the adjustment time down to ~30 seconds.

Shear-Corrected Digital Holography System

Figure 2:
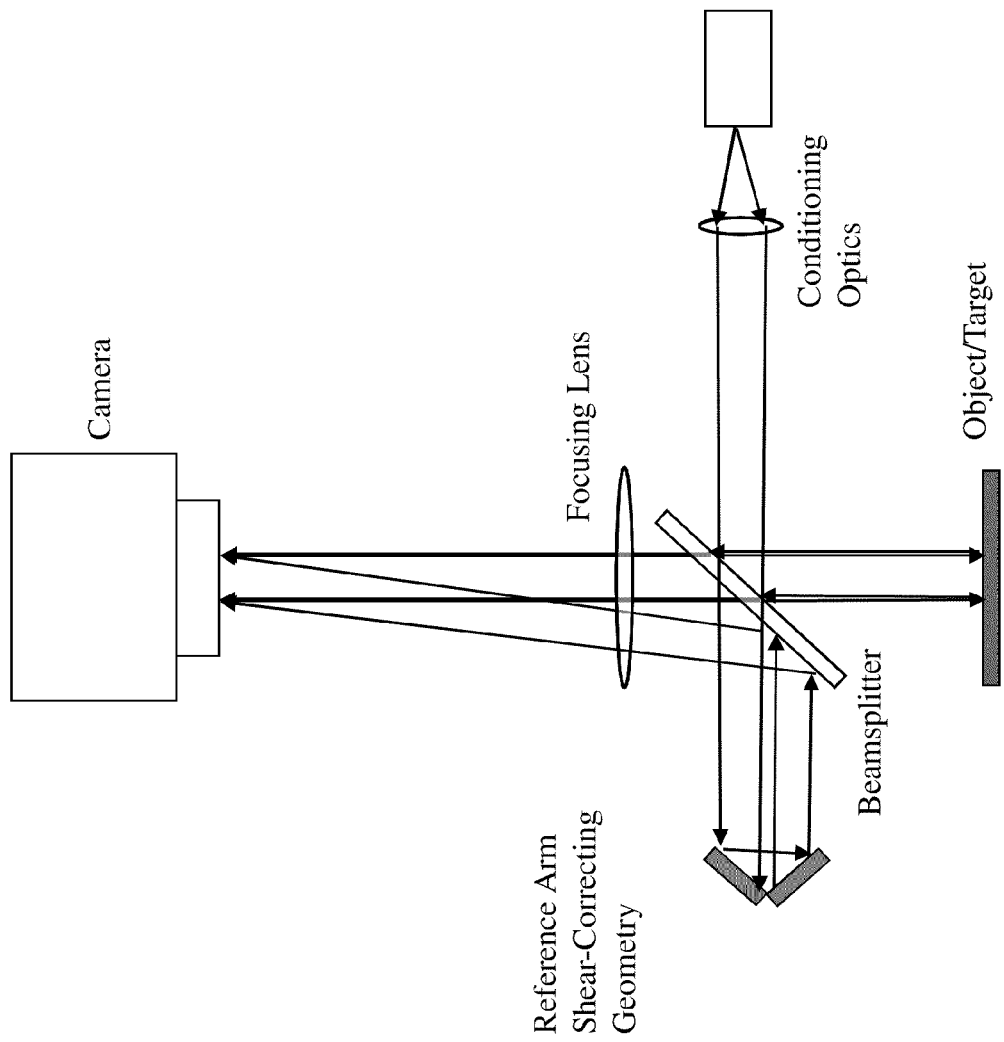
FIG. 2 shows a schematic of a particular modified Michelson Geometry in accordance with one embodiment illustrating a shear-corrected beam in the Reference Arm using a corner-mirror pair and an extended beamsplitter/beam-combiner.
Figure 3:
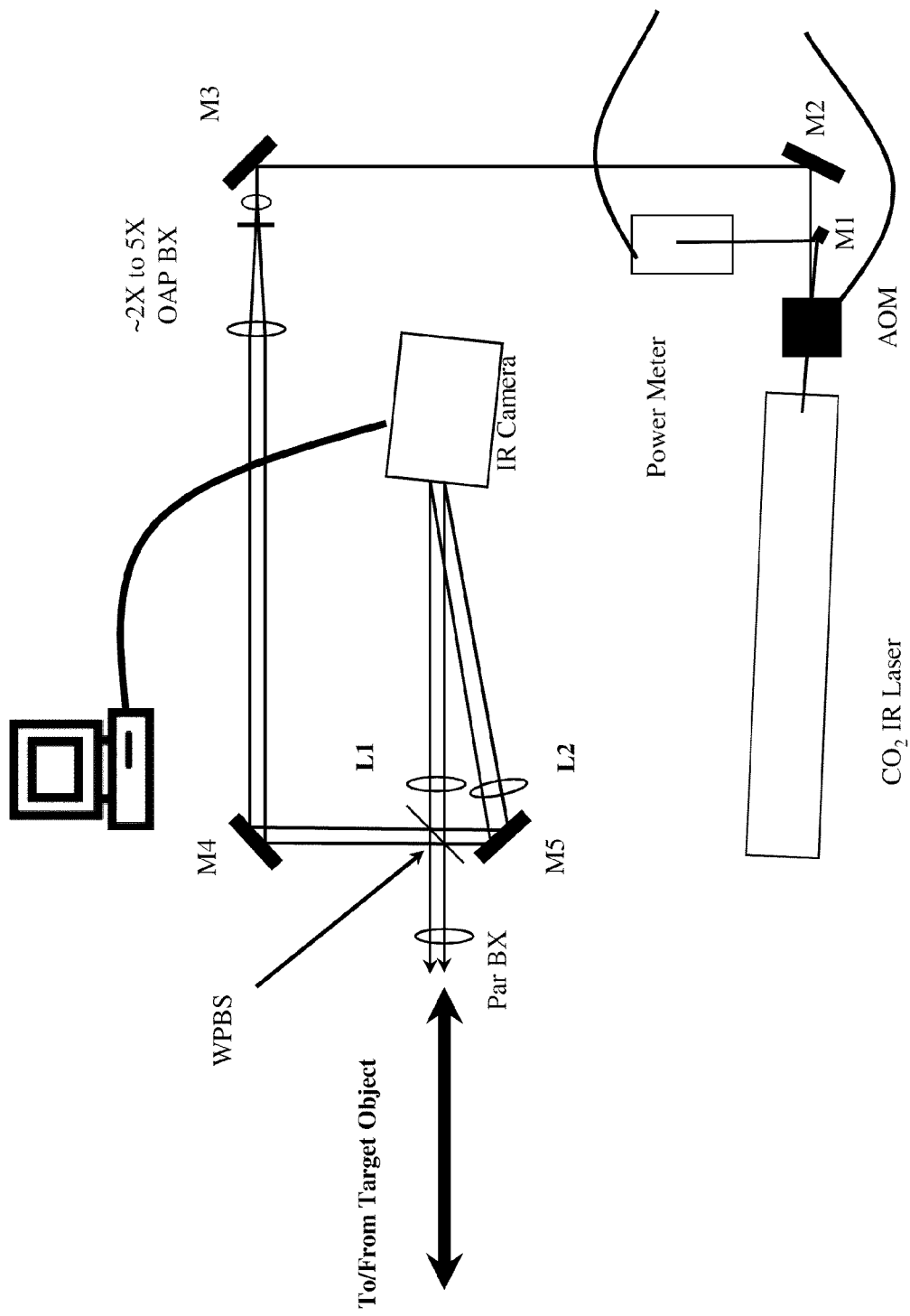
FIG. 3 illustrates a schematic of an Infrared Digital Holography system with an alternate shear-corrected geometry for the Reference Arm, where the reference beam is returned to the recording IR camera without combining with the Object Beam before reaching the camera.
Figure 4:
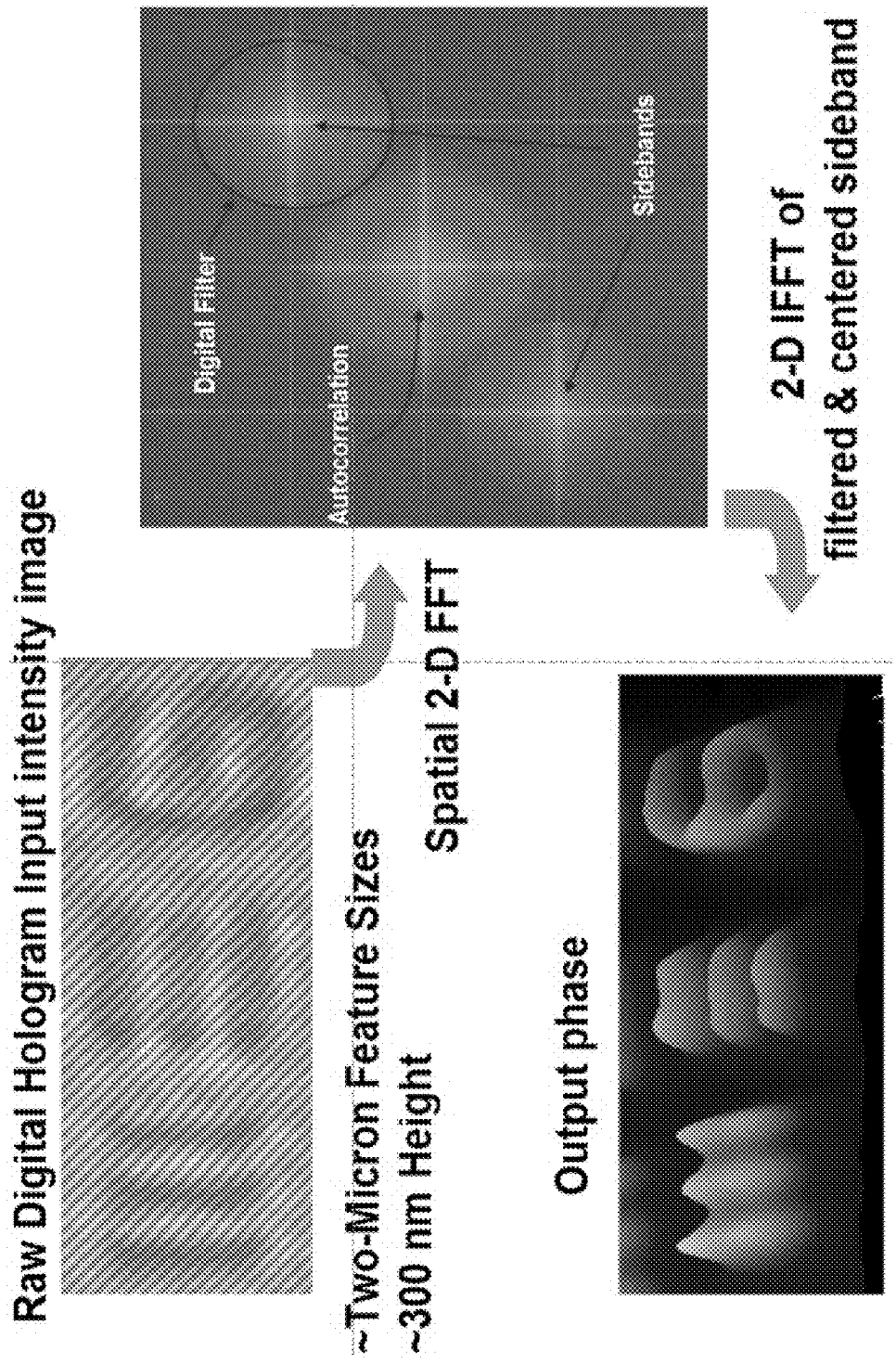
FIG. 4 illustrates schematically the process of using an FFT, axis translation and digital filter, and Inverse FFT (IFFT) to analyze a digital hologram and convert it into phase and amplitude images of the object used to form the hologram.

A schematic of a Shear-Corrected Digital Holography system (SCDH) is shown in FIG. 3. An infrared (IR) system is used for an exemplary system, but the shear-corrected digital holography system can work with all wavelengths of light and digital camera types. Extra turning mirrors and bounces of the ray path as it passes through off-axis-parabola (OAP) beam expanders and focusing elements have been left out. The heart of the system is a stabilized laser. Immediately following the laser is an acousto-optic-modulator (AOM) that diffracts the laser beam with sound-waves when it is pulsed with high-frequency waves (radio-frequency or RF waves). The pickoff mirror M1 catches the CW beam coming from the laser and reflects it into the power meter. The pulsed diffracted beam travels on to mirrors M2 and M3 and is expanded by an OAP pair beam expander (OAP BX). The OAP pair focal lengths are chosen to expand the beam so that it is approximately the same size as the camera sensor. The beam is then reflected through a wedged-plate beam-splitter (WPBS), which splits it into a reference beam going to M5 and an object beam which passes through another OAP BX (shown as Par BX for parabolic beam-expander in the figure) to expand it to a suitable size for the object of interest. The OAP BX's and the WPBS are both chosen to prevent second surface reflections from reaching the camera. Since the OAP BX's are purely front-surface reflective, there are by definition no second surfaces to send noise images to the camera. The second surface of the WPBS is wedged and AR coated. The high quality AR coat minimizes any second surface reflection and then the wedge angle is chosen to direct the second-surface reflection out of the system, so that no noise images reach the camera. After passing through or reflecting from the object (nominally passing through a plasma in this case) the object beam is retroreflected back to a large OAP BX pair denoted as Par BX, which along with the lens (L1), images some plane in the plasma (nominally the transverse plane of the plasma on the center of the object beam return path) on to the camera sensor. The mirror M5 reflects the reference beam so that it more or less exactly overlays the object beam on the camera sensor. This is the shear-corrected part of the digital holography system. Previous digital holography systems have managed both the object beam and the reference beam so that they overlay one another on a final beam combiner. The problem with this is that since the two beams must be at an angle to one another (unless a shearless phase-shifting element is used for the reference beam (10)) they are sheared apart as they travel and do not overlay one another well at the camera. The shear-corrected system either: 1) reflects the reference beam to a location on the beam combiner that does not overlay the object beam, and the shear actually brings the two beams together at the camera sensor (which as shown in FIG. 2 generally requires an oversized beam-combiner); or 2) is set up like M5 in FIG. 3 so that the beam is directly reflected into the camera at the proper angle and from the proper position so that it more or less exactly overlays the object beam at the camera sensor. By using these techniques along with wedged windows for entering/leaving the plasma, no second or first-surface (e.g., from windows) noise images are allowed to reach the camera. Note that the camera is also shown at a slight angle to the object beam. This prevents an etalon from forming between reflections from the camera window or sensor and other optical elements, which would send noise images back to the camera. Where actual lenses are used in the system (L1 and L2), it is similarly necessary to use the lenses in a decentered and/or angled manner to prevent any spurious reflections from the lens surfaces reaching the camera. Note that the lens L2 in the reference arm is not always required, but may be required to match the phase-front shape of the reference beam to the phase-front shape of the object beam in order to produce linear carrier-frequency fringes.

Advantages

A shear-corrected digital hologram acquisition system, representing an embodiment of the invention is cost effective and advantageous for at least the following reasons. The shear-corrected geometry allows a simpler Michelson geometry to be used for systems with arbitrary magnification, which is impossible with a normally sheared system since the beams cease to overlap with one another (and therefore no hologram is created) for many implementations of the Michelson geometry. Similarly, the shear-corrected system makes alignment and overlay much better in a Mach-Zender style system. Additionally, the system is much cheaper and easier to implement than a shearless system. Even with a Mach-Zender geometry, the shear between the beams makes it difficult to adequately overlap the beams in many instances, where the shear-corrected system easily allows alignment. For the exemplary IR system, the shear-corrected geometry allows the reference beam to have its own separate optical path and substantially exactly overlay the object beam.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

REFERENCES

1. Gabor, D., Proc. Roy. Soc. London Ser. A A197, p. 459 (1949).
2. Leith, E., and Upatnieks, J., J. Opt. Soc. Am. 52, p. 1123 (1962).
3. Leith, E., and Upatnieks, J., J. Opt. Soc. Am. 53, p. 1377 (1963).
4. Heflinger, L. O., Wuerker, R. F., and Brooks, R. E., J. App. Phys, 37, p. 643 (1966).
5. Thomas, C. E., et. al., "Direct to Digital Holography and Holovision", U.S. Pat. No. 6,078,392, Jun. 20, 2000. Other patents applied for.
6. Thomas, C. E., and Hanson, G. R., "Acquisition and Replay Systems for Direct-to-Digital Holography and Holovision", U.S. Pat. No. 6,525,821, Feb. 25, 2003. Other patents applied for.
7. Hanson, G. R., and Bingham, P. R., "Faster Processing of Multiple Spatially-Heterodyned Direct to Digital Hologram", U.S. Patent Application 20040212807, Oct. 28, 2004.
8. Hanson, G. R., Bingham, P. R., et al., "Two-Wavelength Spatial-Heterodyne Holography", U.S. Patent Application 20040213462, Oct. 28, 2004.
9. Hanson, G. R., Bingham, P. R., et al., "Recording Multiple Spatially-Heterodyned Direct to Digital Holograms In One Digital Image", U.S. Patent Application 20040213464, Oct. 28, 2004.
10. Thomas, C. E., Bahm, T. M., Baylor, L. R., Bingham, P. R., et al., "Direct To Digital Holography for Semiconductor Wafer Defect Detection And Review", SPIE Conference on Process Control and Diagnostics in IC Manufacturing, Proceedings of SPIE Volume 4692, July 2002, SPIE Press, Bellingham, Wash.
11. Thomas, C. E., Hunt, M. A., Bahm, T. M., Baylor, L. R., et al., "Direct To Digital Holography For High Aspect Ratio Inspection of Semiconductor Wafers", 2003 International Conference on Characterization and Metrology for ULSI Technology, Mar. 24-28, 2003, Austin, Tex., AIP Conf. Proc. 683, 254 (2003).
12. Thomas, C. E., "System and Methods for Shearless Hologram Acquisition", U.S. Pat. No. 7,289,253, Oct. 30, 2007.
13. Voelkl, E., Allard, L. F., and, Joy, D. C., Introduction to Electron Holography, New York: Kluwer Academic/Plenum Publishers, 1999, Chapter 6, and other chapters.
14. Born, M., and Wolf, E., Principles of Optics, Seventh (expanded) Edition, Cambridge: Cambridge University Press, 1999, p. 572 and following.
15. Yariv, A., Optical Electronics, 3rd Edition, New York: Holt, Rinehart and Winston, 1985, Chapter 13, pp 449-453.
16 Thomas, C. E., "System and Methods for Shearless Hologram Acquisition", U.S. Pat. No. 7,936,490, May 3, 2011.

What is claimed is:

1. An apparatus to record a hologram in a shear-corrected manner comprising:
   an illumination source configured to produce a first beam of light;
   an object to be recorded;
   a beamsplitter configured to split the first beam into a reference beam, and an object illumination beam which interacts with said object;
   a focusing element configured to focus at a focal plane a portion of the object illumination beam which has interacted with said object;
   a phase shifting and shear-correcting optical element in the reference beam path only configured to correct the shear in the reference beam, impart a phase shift to the reference beam, and send the phase-shifted and shear-corrected reference beam to the focal plane so that the phase-shifted and shear-corrected reference beam substantially completely overlaps the object illumination beam at the focal plane; and
   an electronic digital recorder positioned substantially at the focal plane and configured to record a spatially heterodyne hologram formed by the phase-shifted and shear-corrected reference beam and the focused portion of the object illumination beam.

2. The apparatus of claim 1 wherein the phase-shifting and shear-correcting optical element consists of one or more mirrors.

3. The apparatus of claim 1 wherein the illumination source consists of one or more lasers.

4. The apparatus of claim 1, wherein the reference beam and the object illumination beam are recombined by the beamsplitter.

5. The apparatus of claim 1, wherein the beamsplitter is configured to receive and combine the phase-shifted and shear-corrected reference beam and the portion of the object illumination beam which has interacted with the object.

6. The apparatus of claim 5, wherein the focusing element is configured to focus at the focal plane the phase-shifted and shear-corrected reference beam.

7. The apparatus of claim 5, wherein at least one additional focusing element is configured to focus at the focal plane the phase-shifted and shear-corrected reference beam.

8. The apparatus of claim 1, wherein an angle θ between the phase-shifted and shear-corrected reference beam and the object illumination beam at the focal plane is less than or equal to an angle at which holographic fringes at the focal plane are spaced by two times a pixel size of the digital recorder.

9. The apparatus of claim 8, wherein the pixel size of the digital recorder is at least five microns, and the holographic fringes at the focal plane are spaced by at least ten microns.

10. A shear-corrected method for recording a hologram comprising: providing a first beam of light;
splitting the first beam into a reference beam and an object illumination beam;
in the reference beam path only imparting a phase shift and shear-correction to the reference beam;
illuminating an object with the object illumination beam;
focusing at a focal plane a portion of the object illumination beam that has illuminated the object;
illuminating the focal plane with the phase-shifted and shear-corrected reference beam so that it substantially exactly overlaps the focused portion of the object illumination beam that has illuminated the object; and
digitally recording, at the focal plane, a spatially heterodyne hologram formed at the focal plane by the phase-shifted and shear-corrected reference beam and the focused portion of the object illumination beam that has interacted with the object.

11. The method of claim 10, wherein phase shifting and shear correcting the reference beam and illuminating the focal plane with the phase-shifted and shear corrected reference beam so that it substantially overlaps the focused portion of the object illumination beam that has illuminated the object is accomplished by means of one or more reflections.

12. The method of claim 10, wherein the phase-shifted and shear-corrected reference beam is combined with the object illumination beam prior to focusing the phase-shifted and shear-corrected reference beam and the object illumination beam at the focal plane.

13. The method of claim 10, wherein imparting the phase shift and shear-correction to the reference beam comprises reflecting the reference beam one or more times.

14. The method of claim 10, wherein an angle θ between the phase-shifted and shear-corrected reference beam and the object illumination beam at the focal plane is less than or equal to an angle at which holographic fringes at the focal plane are spaced by two times a pixel size of the digitally recorded hologram.

15. The method of claim 14, wherein the sample size of the digitally recorded hologram is at least five microns, and the holographic fringes at the focal plane are spaced by at least ten microns.

* * * * *